US008257185B2

(12) United States Patent
Carter et al.

(10) Patent No.: US 8,257,185 B2
(45) Date of Patent: Sep. 4, 2012

(54) METAL AND PLASTIC OLDHAM COUPLER WITH ADDED RETRACTION SPLINE AND PLASTIC OVER MOLDED FEATURES

(75) Inventors: Daniel Lee Carter, Georgetown, KY (US); Larry Steven Foster, Lexington, KY (US); Robert Michael Meadows, Nicholasville, KY (US); Harald Portig, Versailles, KY (US); David Erwin Rennick, Georgetown, KY (US); Brian Reed Spencer, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 305 days.

(21) Appl. No.: 12/650,708

(22) Filed: Dec. 31, 2009

(65) Prior Publication Data

US 2010/0292014 A1 Nov. 18, 2010

Related U.S. Application Data

(60) Provisional application No. 61/177,441, filed on May 12, 2009.

(51) Int. Cl.
*F16D 3/04* (2006.01)

(52) U.S. Cl. .......................................................... 464/105

(58) Field of Classification Search .......... 464/102–105; 399/117, 167, 222

See application file for complete search history.

(56) References Cited

U.S. PATENT DOCUMENTS

| | | | | |
|---|---|---|---|---|
| 1,352,953 | A * | 9/1920 | Grundy | 464/105 |
| 3,662,568 | A * | 5/1972 | Kashima et al. | |
| 4,756,630 | A * | 7/1988 | Teeslink | |
| 7,172,361 | B2 * | 2/2007 | Minamoto et al. | |
| 2008/0119294 | A1 * | 5/2008 | Erikson et al. | 464/104 |
| 2008/0138113 | A1 * | 6/2008 | Murrell et al. | 399/167 |
| 2009/0230825 | A1 * | 9/2009 | Braun et al. | 464/104 |

FOREIGN PATENT DOCUMENTS

JP 2000-027878 * 1/2000

OTHER PUBLICATIONS

"Overmolding." Kamek. Jun. 15, 2008, [online], [retrieved on Nov. 29, 2011] Retrieved from the Internet <URL: http://web.archive.org/web/20080615013944/http://www.kamek.com/Overmolding/Default.aspx>.*

* cited by examiner

*Primary Examiner* — Gregory Binda
*Assistant Examiner* — Josh Skroupa
(74) *Attorney, Agent, or Firm* — Justin M Tromp

(57) ABSTRACT

An Oldham coupler assembly capable of transferring rotary power between two shafts in a developer unit of an image forming apparatus that includes an input plate and an output plate made of metal and a star plate made in plastic mechanically coupled and positioned in between the input plate and the output plate. A spline component made of metal is rigidly and integrally attached to the input plate, the spline component including a tubular spline portion that includes a plurality of wear strips made of plastic, the output plate having a plastic material coated along a portion of an outside diameter of the output plate. The input and output plates further include a plurality of openings to receive a plurality of wheels and pins. This structure allows a sufficiently stiff drive system to substantially eliminate fine line jitter by raising the natural frequency of the drive system.

12 Claims, 5 Drawing Sheets

METAL AND PLASTIC OLDHAM COUPLER WITH ADDED RETRACTION SPLINE AND PLASTIC OVER MOLDED FEATURES

CROSS REFERENCES TO RELATED APPLICATION

This application claims the benefit of the earlier filing date of Application Ser. No. 61/177,441, filed May 12, 2009, entitled "Printing Device." The present application hereby incorporates by reference the above identified patent applications in their entirety.

BACKGROUND

1. Field of the Invention

The present invention relates generally to image formation devices, and in particular to a coupling retraction mechanism for a color electrophotographic printer. Specifically, the present invention discloses an Oldham coupler for transferring rotary power between two shafts in a developer unit of the image formation device including an input metal plate, a plastic star plate and an output metal plate.

2. Description of the Related Art

Oldham couplers have been employed for many years in drive systems of diverse machines for transferring torque or rotary power between two parallel but non-collinear and/or non-radially aligned rotating shafts. In the past, Oldham couplers with retraction splines have all the components made out of plastic. This leads to a weak design from the standpoint of the stiffness of the drive connections in the drive system. Since mono or color machines are sensitive to low frequency oscillations of the drive connections, the all-plastic components can cause banding in the range of 0.5 to 2 mm on a media sheet as the drive system oscillates which appear as light and dark bands on the printed media sheet.

Given the foregoing, there is a need for an improved Oldham coupler that possesses the requisite stiffness, is simple in construction and is relatively easy to manufacture.

SUMMARY OF THE INVENTION

According to an exemplary embodiment of the present invention, there is provided an Oldham coupler assembly capable of transferring rotary power between two shafts in a developer unit of an imaging apparatus including an input plate and an output plate made of a first material, a star plate made of a second material positioned in between and mechanically coupled to the input plate and the output plate and a spline component made of the first material rigidly and integrally attached to the input plate. The spline component is an elongated tubular spline portion including a plurality of wear strips, the wear strips providing an area to engage with a mating spline. The second material may be a plastic composition. One or both of the input plate and the output plate may have overmolded plastic features.

In some embodiments, the first material provides a stiffness ranging from approximately 14 in-oz/degree to approximately 24 in-oz/degree.

In some embodiments, the output plate further includes a plurality of openings having a first width and a second width, the first width being different from the second width. The plurality of openings increase in width from the first width to the second width from a center of the openings.

In yet another aspect of the invention, a composite torque transfer assembly is disclosed including a metal input plate and a metal output plate, a plastic star plate coupled to the metal input plate and the metal output plate, a metal drive spline rigidly and integrally attached to the metal input plate, the metal drive spline including a plurality of plastic wear strips providing an area to engage with a mating spline, and a plastic material coated along a portion of an outside diameter of the metal output plate.

In another embodiment, the plurality of plastic molded openings are symmetrically arranged to receive a plurality of pins for securing wheels to the output plate.

BRIEF DESCRIPTION OF THE DRAWINGS

The above-mentioned and other features and advantages of the various embodiments of the invention, and the manner of attaining them, will become more apparent and will be better understood by reference to the accompanying drawings, wherein.

DETAILED DESCRIPTION

Figure 1:
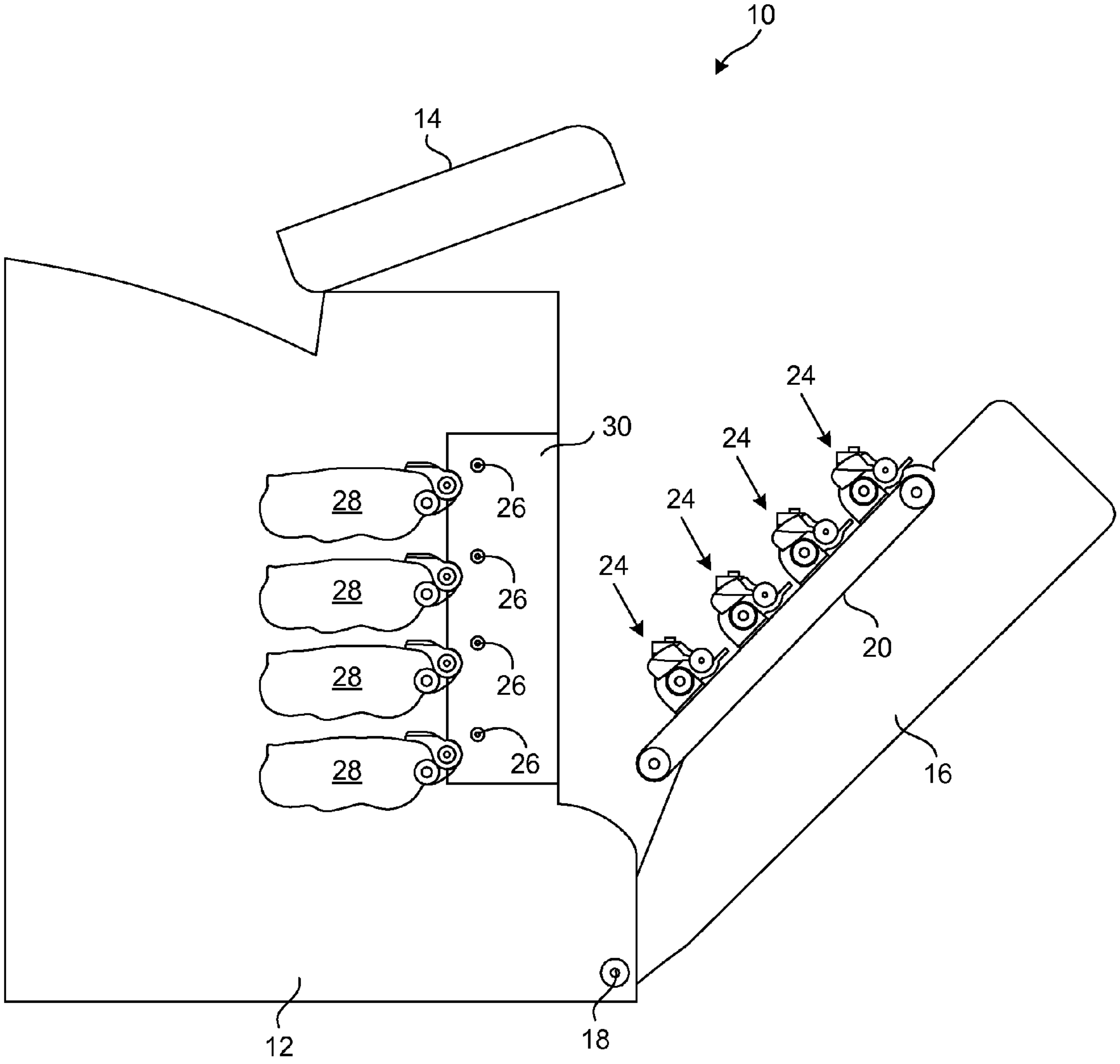
FIG. 1 is a representative image forming apparatus having a plurality of pairs of separate developer units and photoconductor units and an openable and closable subunit.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Reference will now be made in detail to the exemplary embodiment(s) of the invention as illustrated in the accompanying drawings. Whenever possible, the same reference numerals will be used throughout the drawings to refer to the same or like parts.

FIG. 1 depicts an image forming apparatus 10 including a housing 12 with a top portion 14, a subunit 16 separated from the housing 12 by pivoting about a hinge point 18. The media sheet transport belt 20 and the photoconductor units 24 are mounted to the subunit 16. To allow the photoconductor units 24 to clear the housing 12 when the subunit 16 is opened, the photoconductor units 24 are first decoupled from the drive mechanism couplings 26 within the housing 12 that supply rotary power to the photoconductor units 24. Additionally, to remove or insert a developer unit 28 from or into the housing 12, at least the developer unit 28 of interest must be decoupled from the drive mechanism couplings 26 that supply rotary power to it. Furthermore, since the developer units 28 are inserted and removed from the housing 12 in a direction at approximately right angles to the axes of the rollers within the cartridges, the drive mechanism couplings 26 must be decoupled to provide mechanical clearance for the removal or insertion of the developer unit 28 cartridges.

In one embodiment, each of the drive mechanism couplings 26 to developer units 28 and photoconductor units 24 are decoupled and/or retracted substantially simultaneously, allowing for removal and replacement without individually retracting each drive mechanism coupling 26. In particular, the drive mechanism couplings 26 are automatically retracted relative to developer units 28 and photoconductor units 24 whenever the subunit 16 is opened to allow access to such units, without requiring further action on the part of the operator. According to various embodiments of the present invention, all of the drive couplers supplying rotary power to the developer units 28 and the photoconductor units 24 are retracted simultaneously, by actuation of a translatable retraction plate 30 within a coupling retraction mechanism, as described in further detail below.

Figure 2:
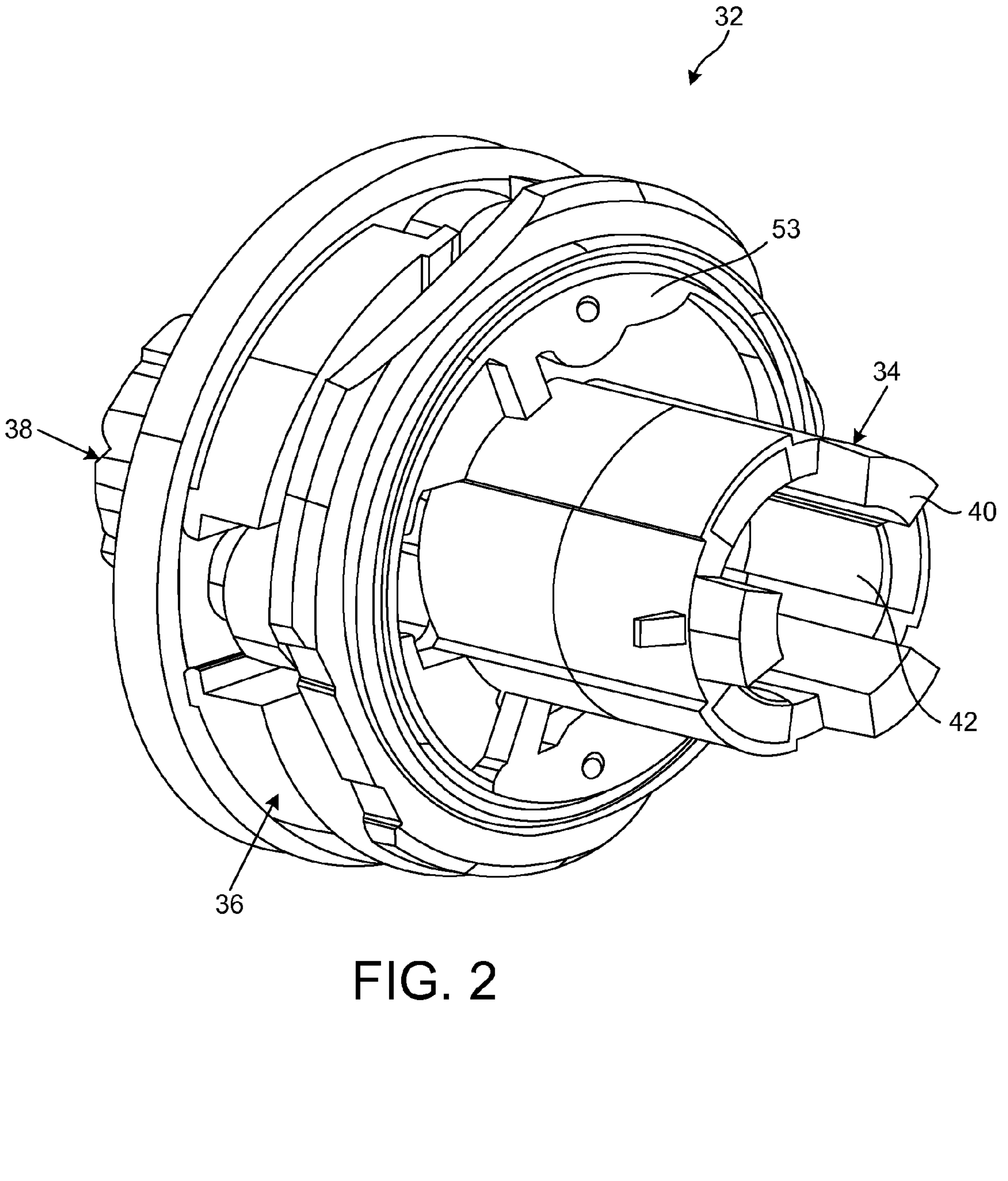
FIG. 2 is a perspective view of an assembly of an Oldham coupler assembly according to one embodiment of the present invention.
Figure 3:
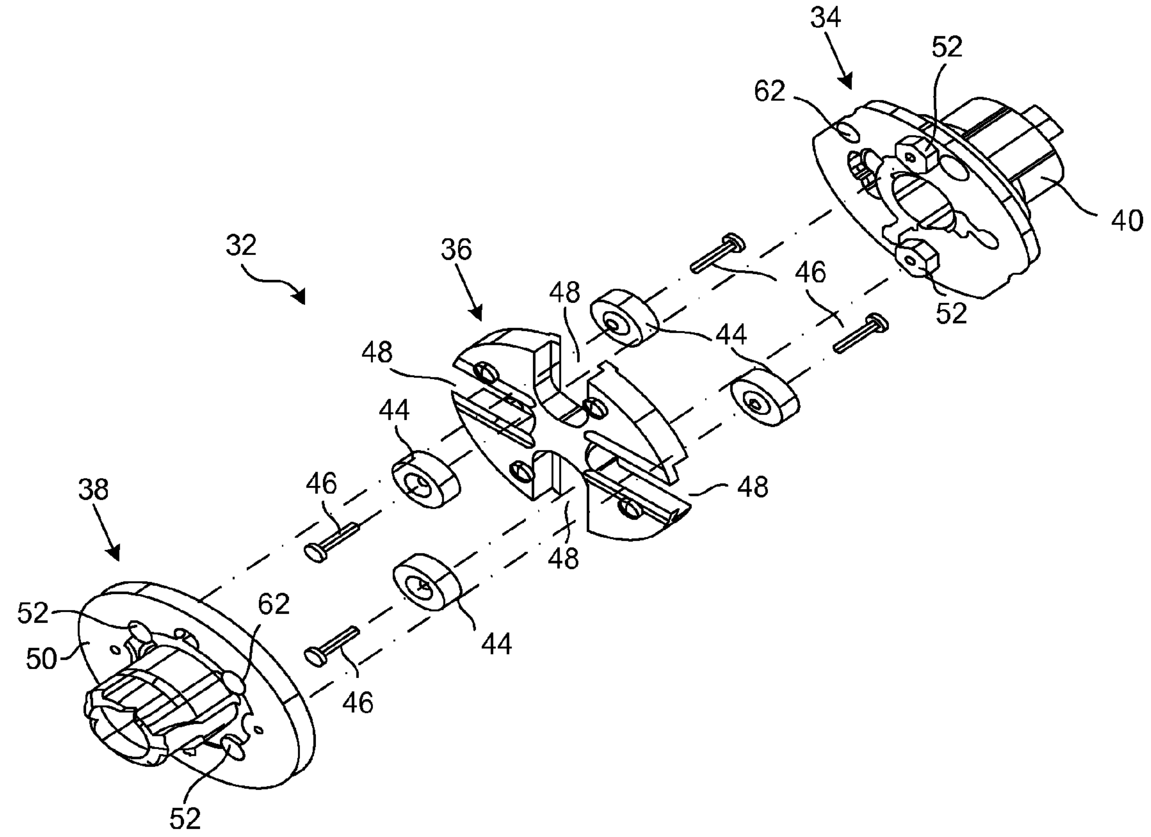
FIG. 3 is an exploded view of the Oldham coupler of FIG. 2 with a plastic over molded coated on the input plate and the output plate.

FIGS. 2 and 3 illustrate an assembly of an Oldham coupler 32, according to an exemplary embodiment of the present invention. The assembly 32 generally includes an input plate 34, a star plate 36, and an output plate 38. A spline component 40 in the form of an elongated tubular spline portion is integrally attached to the input plate 34 and the output plate 38.

The star plate 36 of the assembly 32 is coupled in between the input plate 34 and the output plate 38. The star plate 36 is made of a first material, such as a molded plastic material, such as acetal. Alternatively, star plate 36 is made from Nylon, Nylon with glass, ABS, or the like.

The input plate 34 and the output plate 38 of the assembly 32 are made of a second material that is different from the first material of the star plate 36. The second material has a stiffness greater than that of the first material. By way of example, the greater stiffness of the second material over that of the first material can provide the assembly 32 with stiffness ranging from approximately 14 in-oz/degree to approximately 24 in-oz/degree. The second material can be zinc, steel, aluminum, magnesium, brass, bronze or the like. In one exemplary embodiment, the second material of the assembly 32 is cast zinc, which can be readily manufactured and provides the desired stiffness at relatively low cost. The star plate 36 in plastic form gives an added advantage since it provides lower mass and inertia when the star plate 36 rotates off its center of gravity during operation. Due to the lower mass and inertia of the star plate 36, less side forces are transmitted by the assembly 32 of the Oldham coupler which causes less movement to the photoconductor drum being driven by the Oldham coupler. This leads to better print quality. Also, due to the reduced movement of the photoconductor drum the chance of loosing the nip force between the photoconductor drum and the developer roll is substantially averted.

The spline component 40, rigidly and integrally attached to the input plate 34, is an elongated tubular spline portion extending from the input plate 34. The spline component 40 further includes a plurality of wear strips 42 disposed along an inner surface thereof. The wear strips 42 are made of the first material discussed above. The wear strips 42 serve two purposes. First, wear strips 42 provide an area for a mating spline to ride on that has better wear characteristics because of the wear strips 42 being plastic in nature. Second, the wear strips 42 provide lower friction when compared to metal wear strips. The wear strips 42 also act as a centering device for the mating splines when not transmitting torque.

FIG. 3 illustrates an exploded view of the assembly 32 that includes the input plate 34, the star plate 36 and the output plate 38. The assembly 32 also includes a plurality of wheels 44 and pins 46 that are secured to the input plate 34 and output plate 38. The plurality of wheels 44 move within slots 48 defined in the star plate 36. Spline 40 on the input plate 34 mates with similar features on the inside of a mating receiver spline (not shown).

As shown in FIG. 3, output plate 38 includes an over molded feature 50 made of a plastic coating along a portion of the outside diameter. The over molded feature may cover not only the outside circumference of output plate 38 but also a major portion of the outwardly facing surface thereof. The over molded feature 50 further includes a plurality of molded openings 52 formed for allowing the plurality of pins 46 to be pressed therein, and one or more anchors 62 for securing over molded features 50 to output plate 38. Specifically, the areas where the plurality of pins 46 are to be pressed into the output plate 38 are coated with over molded feature 50 to form the plurality of molded openings 52 to avoid any secondary operations on the molded part apart from simply pressing the plurality of pins 46 into the plurality of molded openings 52. Rotatable wheels 44 are secured to output plate 38 via pins 46.

Input plate 34 may include plastic overmolded features forming a ring 53 (FIG. 2) formed along the outer surface of input plate 34, a plurality of molded openings 52 (FIG. 3) for receiving pins 46 to secure wheels 44 to input plate 34, and one or more anchors 62 for securing the above overmolded features thereto.

Coating a plastic over molded feature 50 on the input plate 34 and the output plate 38 has an advantage that the plurality pins 46 can be simply pressed into the input plate 34 and the output plate 38 because of the plastic coating on the input plate 34 and the output plate 38. If the input plate 34 and the output plate 38 are not coated with over molded features 50, the plurality of molded openings 52 would have to be drilled to achieve an appropriate press fit on the pins 46, since the input plate 34 and the output plate 38 are made of metal.

Figure 4:
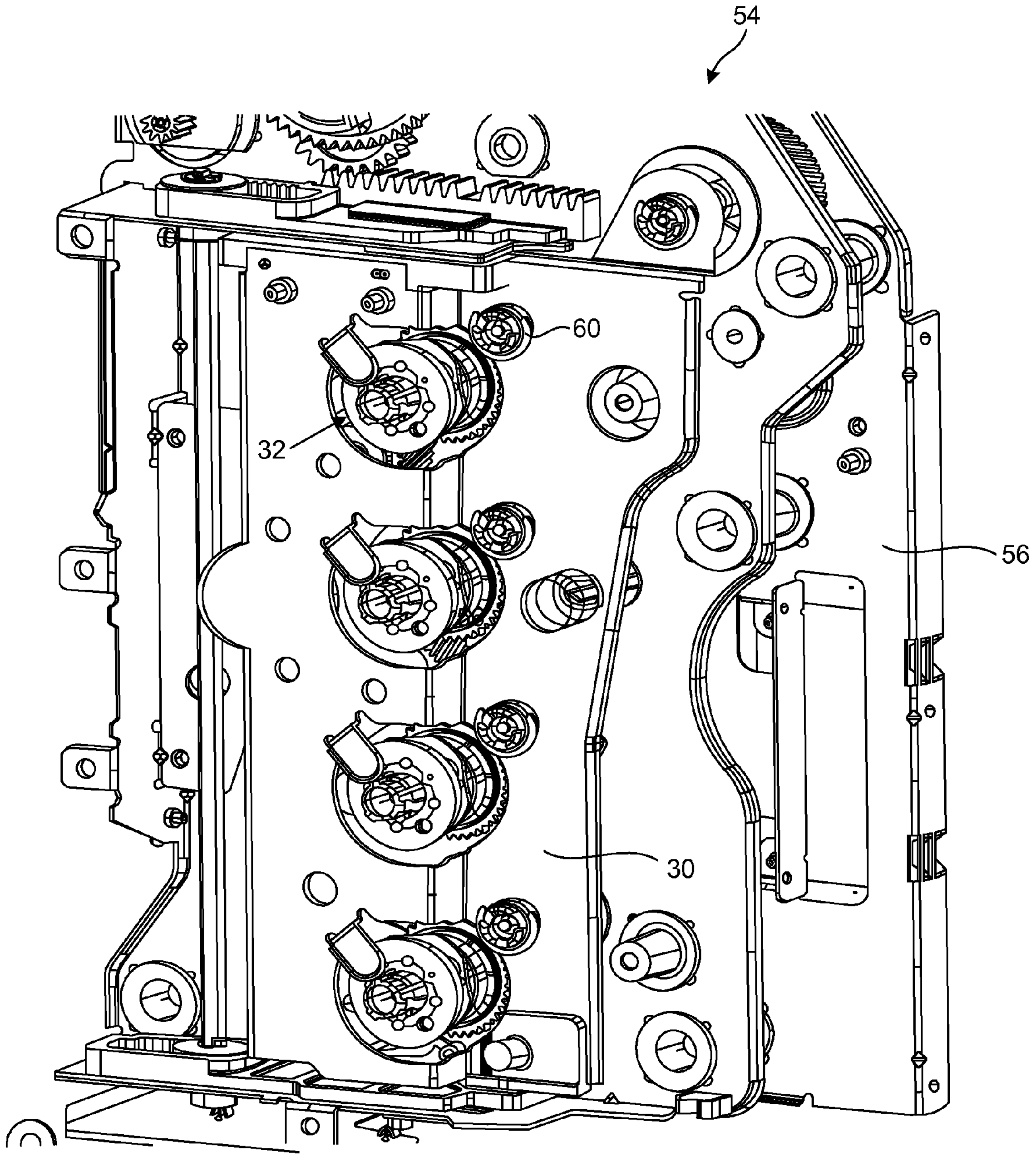
FIG. 4 is a perspective view of a pivoting coupling retraction plate assembly according to an embodiment of the present invention.

FIG. 4 depicts a pivoting coupling retraction mechanism according to one embodiment of the present invention, indicated by numeral 54. The pivoting coupling retraction mechanism 54 includes a gearbox frame 56 housing various drive components such as motors, gears, and the like, and a retraction plate 30. Mounted to gearbox 56, and axially retained by the pivoting retraction plate 30, are a plurality of Oldham coupler assemblies 32 according to embodiments of the present invention, which mate and provide rotational power to the corresponding plurality of developer units 28 (FIG. 1). The Oldham coupler assemblies 32 transfer rotary power between two parallel, but not necessarily radially aligned shafts. Additionally mounted to gearbox frame 56, and axially retained by the pivoting retraction plate 30, is a plurality of photoconductor unit couplers 60, each of which couples with and provides rotary power to a corresponding photoconductor unit 24 (FIG. 1).

The Oldham coupler assemblies 32 and photoconductor unit couplers 60 are biased by springs. The couplers 32 and 60 mate with their respective input members on the removable cartridges (developer units 28 and photoconductor units 24, respectively) when the retraction plate 30 is in an engaged position. According to embodiments of the present invention, Oldham coupling assemblies 32 and photoconductor unit couplers 60 (four of each in the embodiment as shown in FIG. 4) are simultaneously retracted in an axial direction of the coupler shafts as the retraction plate 30 moves from an engaged to a retracted position. The retraction plate 30 retracts both the Oldham coupler 32 and the photoconductor unit couplers 60 laterally, in an axial direction, thus disengaging the couplers 32 and 60. With the couplers 32 and 60 thus retracted, the subunit 16 holding the photoconductor units 24 are opened and the developer units 28 may be freely removed from, or inserted into, the housing 12 of the image forming apparatus 10 (FIG. 1).

Figure 5:
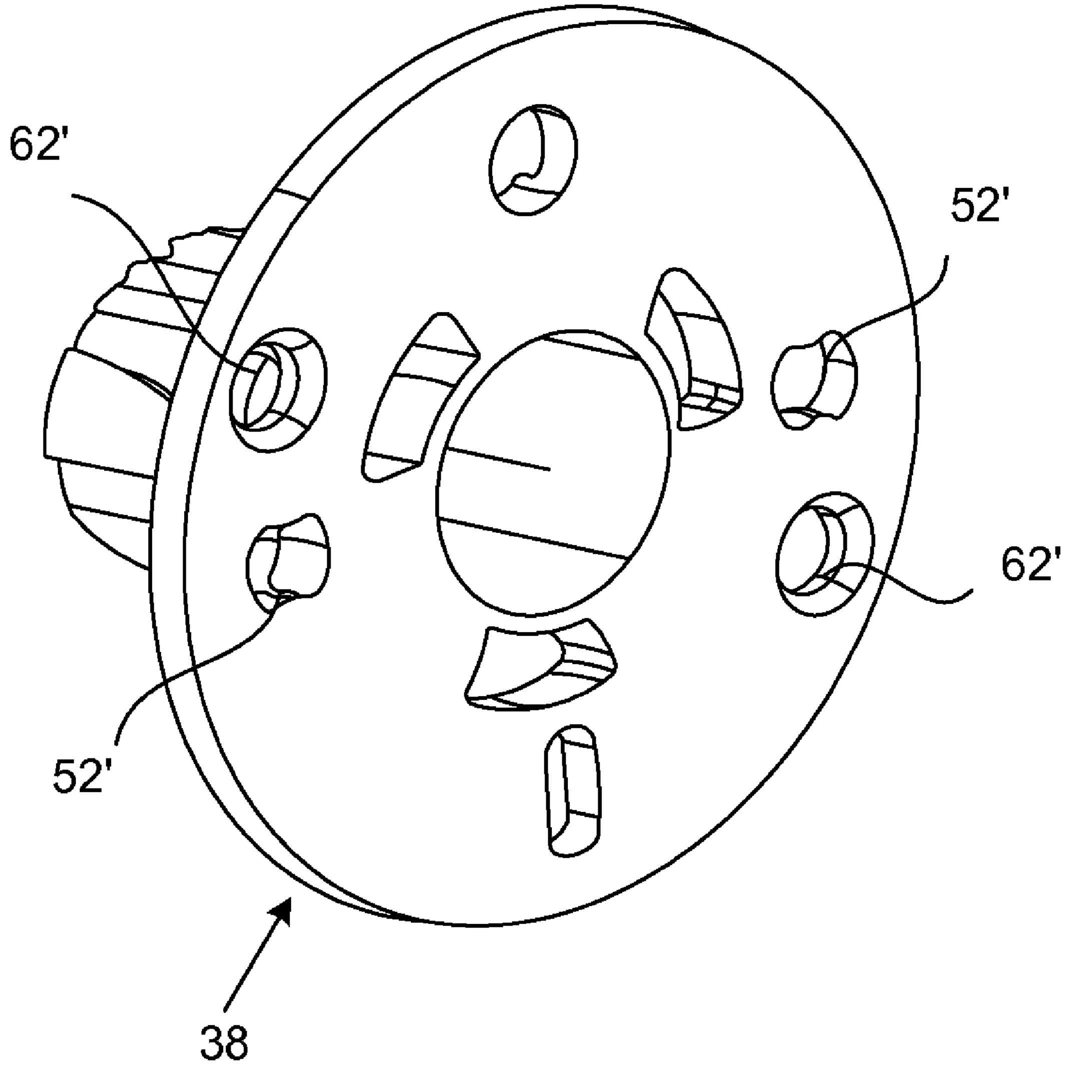
FIG. 5 is a perspective view of the output plate of FIGS. 2 and 3 prior to overmolding.

FIG. 5 illustrates output plate 38 prior to being subjected to the overmolding process. Output plate 38 includes a plurality of openings 52' from which openings 52 are formed during the overmolding process. Each opening 52', when viewed from either major surface of output plate 38, is substantially symmetrical about either or both of a horizontal (longitudinal) axis and a vertical (lateral) axis extending through a center point of opening 52'. For instance, each opening 52' may have a substantially oblong shape—curved and/or semicircular, concave shape at each side of opening 52', and curved, convex shapes at upper and lower portions thereof. It is understood, however, that openings 52' may have any of a number of substantially symmetrical shapes, such as a clover shape.

With further reference to FIG. 5, output plate 38 includes a plurality of openings 62' from which anchors 62 are formed during the overmolding process. In one embodiment, a size of opening 62' along one surface of output plate 38 may be larger than a size of the opening 62' along the second surface thereof. In another embodiment, a size of opening 62' along a center of output plate 38 may be smaller or larger than a size of opening 62' along each surface of output plate 38. It is understood that the size of opening 62' may vary in other ways from one surface of output plate 38 to the other surface.

It is understood that input plate 34 has openings 52' and 62' as illustrated in FIG. 5 and described herein for forming overmolded openings 52 and anchors 62, respectively.

In particular, each opening 52' may have a first width and a second width, the first width being different from the second width. The plurality of openings 52' decrease in width from the first width to the second width when viewed from the horizontal (longitudinal) axis extending through a center of the openings 52'. This resulting feature of the plurality of molded openings 52 allows for a good locking between output plate 38 and overmold feature 50 as well as between input plate 34 and overmold feature 50. The plurality of molded openings 52 are symmetrically aligned to receive the plurality of pins 46 (FIG. 3). A plurality of anchors 62 are defined around the input plate 34 and output plate 38 to keep the location of the overmolded parts relative thereto as the over molded feature 50 shrinks. Because of the shape of the plurality of openings 52', the over molded feature 50 on each plate 34 and 38 would not shrink away from the metal parts and does not cause looseness between the parts. Since the Oldham coupler 32 rides in the metal retraction plate 30 during movement from retraction and non-retraction, there is some rotation during the process. The over molded feature 50 on output plate 38 being in plastic gives a good low friction wear surface for the output plate to rotate. Since the over molded feature 50 surrounds the outside circumference of the output plate 38, the over molded feature 50 is held tight by its shrinkage during cooling in the mold that gives a strong clamp between the overmold and each of plates 34 and 38. Similarly, anchors 62 are held tight by its shrinkage during cooling in the mold.

The structural elements employed in the present invention of metal and plastic combination control the location and firmly secure the components together in a manner that will transmit high torque loads required to drive the developer unit 28. The composite torque transfer assembly of the present invention demonstrates a substantial elimination of jitter of about 0.6 to about 0.75 mm on a media sheet.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An Oldham coupler assembly capable of transferring rotary power between two shafts, comprising:
- a metal input plate and a metal output plate, at least one of the metal input plate and the metal output plate having a plurality of noncircular openings, each opening having a substantially symmetrical shape relative to a longitudinal axis and a lateral axis passing through a center point of the noncircular opening, wherein at least a portion of said metal input plate or output plate having the noncircular openings is over molded in plastic and a plurality of molded openings are formed in the over molded plastic from the plurality of noncircular openings in said metal input plate or output plate;
- a plastic star plate positioned in between and mechanically coupled to the metal input plate and the metal output plate; and
- a plurality of pins and wheels, each pin being attached to said metal input plate or output plate having the noncircular openings at one of said molded openings securing one of said wheels thereto, the wheels being engaged with the star plate.

2. The Oldham coupler assembly of claim 1, wherein the metal input plate comprises:
- a spline component made of the first material rigidly and integrally attached to the metal input plate, the spline component comprising an elongated tubular portion and including a plurality of wear strips arranged along an inner surface of the elongated tubular portion providing an area to engage with a mating member.

3. The Oldham coupler assembly of claim 1, wherein the metal input plate and the metal output plate comprise a material selected from a group of materials including zinc, steel, aluminum, magnesium, brass and bronze.

4. The Oldham coupler assembly of claim 1, wherein the metal material of the input plate and the output plate provides a stiffness ranging from approximately 14 in-oz/degree to approximately 24 in-oz/degree.

5. The Oldham coupler assembly of claim 1, wherein said metal input plate or output plate having the noncircular openings further includes a plurality of anchor openings therethrough and a respective anchor is formed in each of said anchor openings by the over molded plastic on said metal input plate or output plate.

6. The Oldham coupler assembly of claim 5, wherein each of the anchor openings varies in size between an outer side of said metal input plate or output plate having the noncircular openings and an inner side of said metal input plate or output plate.

7. A composite torque transfer assembly, comprising
- a metal input plate and a metal output plate, the metal input plate and the metal output plate having a plurality of anchor openings therethrough, wherein at least a portion of the metal input plate and the metal output plate is coated in plastic and a respective anchor is formed in each of said anchor openings by the coated plastic; and
- a plastic star plate coupled to the metal input plate and the metal output plate.

8. The assembly of claim 7, further comprising a metal drive spline rigidly and integrally attached to the metal input plate, the metal drive spline comprising a plurality of plastic wear strips arranged along an inner surface thereof for providing an area to engage with a mating spline.

9. The assembly of claim 8, wherein said metal drive spline provides the torque transfer assembly with stiffness ranging from approximately 14 in-oz/degree to approximately 24 in-oz/degree.

10. The assembly of claim 7, wherein the metal input plate and the metal output plate further comprise a plurality of molded openings formed in the coated plastic, wherein the assembly further comprises a plurality of pins and wheels, the pins being attached to the metal input plate and the metal output plate for securing the wheels thereto, the wheels engaging with the star plate.

11. The assembly of claim 10, wherein the metal input plate and output plate each includes a plurality of noncircular openings which serve to define the molded openings, each of the noncircular openings is substantially symmetrical about a longitudinal axis and a lateral axis passing through a center point of the opening.

12. The Oldham coupler assembly of claim 7, wherein each of the anchor openings varies in size between an outer side of said metal input plate and output plate and an inner side of said metal input plate and output plate.

* * * * *